United States Patent [19]
Dzewaltowski et al.

[11] Patent Number: 4,703,142
[45] Date of Patent: Oct. 27, 1987

[54] METHOD OF COMBINING GRINDING AND EDM OPERATION FOR FINISHING FUEL INJECTOR NOZZLE BODIES

[75] Inventors: Victor F. Dzewaltowski; James Halvorsen, both of Springfield, Vt.; John M. Check, Chelsea, Mich.

[73] Assignee: Ex-Cell-O Corporation, Walled Lake, Mich.

[21] Appl. No.: 857,880

[22] Filed: May 1, 1986

[51] Int. Cl.⁴ .......................... B23H 1/00; B23H 9/10
[52] U.S. Cl. .................. 219/69 M; 219/69 E; 219/69 R; 239/533.3
[58] Field of Search ............... 219/69 M, 69 V, 69 R, 219/69 E; 408/42–44; 239/533.3

[56] References Cited

U.S. PATENT DOCUMENTS

| | | | |
|---|---|---|---|
| 2,619,856 | 12/1952 | Hutchinson | 408/43 |
| 3,388,232 | 6/1968 | Dreisin | 219/69 M |
| 3,768,344 | 10/1973 | Feldcamp | 219/69 M |
| 4,106,702 | 8/1978 | Gardner et al. | 239/533.3 |
| 4,163,313 | 8/1979 | Matsuno et al. | 408/44 |
| 4,275,844 | 6/1981 | Grgurich et al. | 239/533.3 |
| 4,419,612 | 12/1983 | Reda et al. | 51/165.71 |
| 4,639,568 | 1/1987 | Check et al. | 219/69 E |

FOREIGN PATENT DOCUMENTS

| | | | |
|---|---|---|---|
| 119314 | 9/1981 | Japan | 219/69 M |
| 107759 | 7/1982 | Japan | 29/564 |
| 906603 | 9/1962 | United Kingdom | 239/533.3 |
| 829388 | 5/1981 | U.S.S.R. | 219/69 M |
| 865576 | 9/1981 | U.S.S.R. | 219/69 M |

OTHER PUBLICATIONS

"A Real Rough Story" by Wijers, *EDM Digest*, Sep.-/Oct. 1985, vol. VII, No. 5.

*Primary Examiner*—A. D. Pellinen
*Assistant Examiner*—Geoffrey S. Evans
*Attorney, Agent, or Firm*—John P. Moran

[57] ABSTRACT

A combined grinding and EDM apparatus has an indexable rotary turret with work heads secured thereon to locate a pair of nozzle body blanks with their longitudinal axes in spaced parallelism; and compound cross and longitudinal slide assemblies carrying either grinding tools or non-contact machining tools which work on the blanks to form a valve guide bore and a valve seat shaped as a frustrum of a cone whose axis is concentric with the bore; the valve seat cone surface having a small end diameter to large end diameter ratio in the order of 1-50.

5 Claims, 11 Drawing Figures

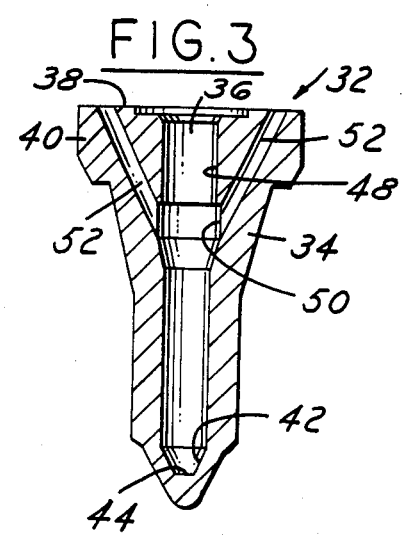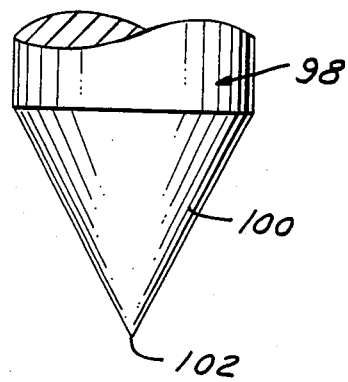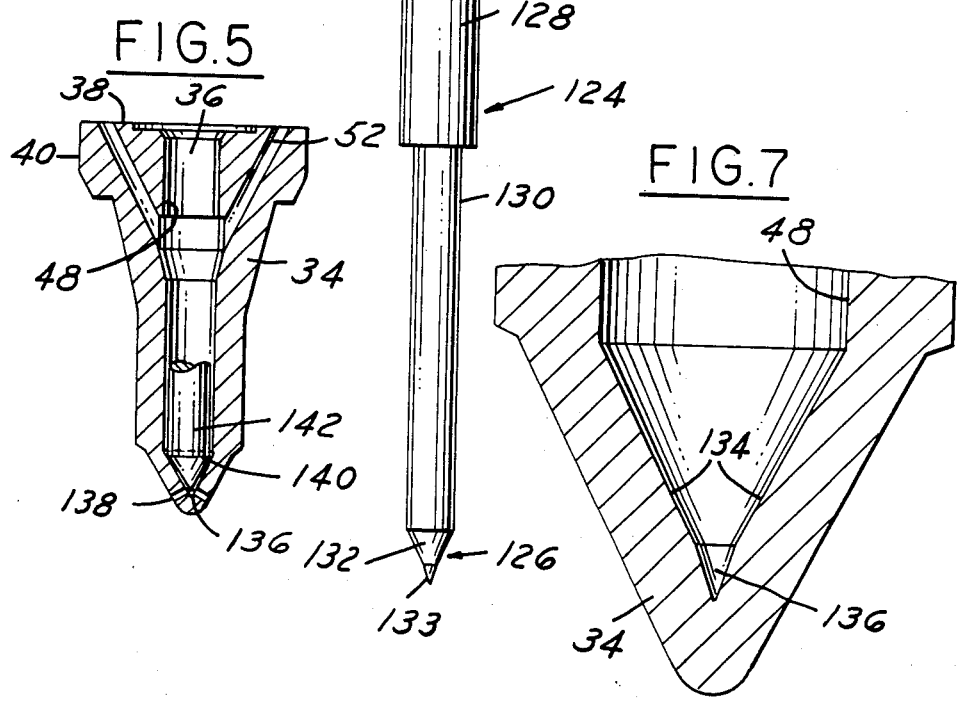

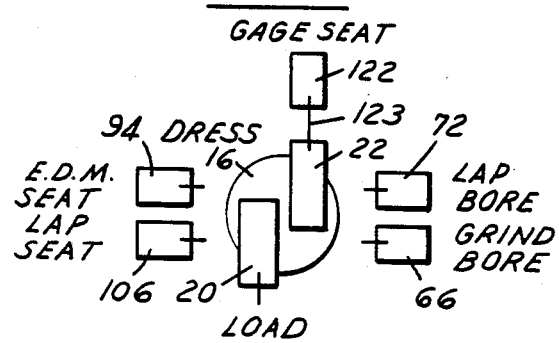
FIG. 8
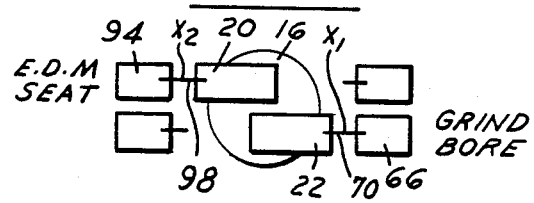
FIG. 8A
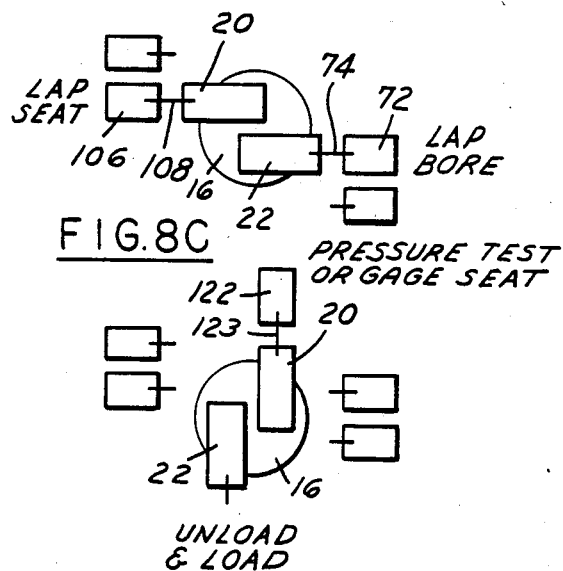
FIG. 8B
FIG. 8C

METHOD OF COMBINING GRINDING AND EDM OPERATION FOR FINISHING FUEL INJECTOR NOZZLE BODIES

This invention relates to apparatus and a method for finishing fuel injector nozzle bodies and more particularly to apparatus and a method for forming a fuel injector nozzle body with a concentric valve guide bore and valve seat of frustrum cone shape with a reduced small end diameter.

BACKGROUND OF THE INVENTION

Prior art fuel injector nozzle bodies have a valve guide bore in which a needle valve is reciprocated between open and closed positions with respect to an interior valve seat shaped as a frustrum of a cone. The valve seat is spaced from an injector nozzle body sack in communication with fuel holes for distributing the fuel. Injector nozzle bodies have had a hemispherically configured sack region formed in the nozzle downstream of the seat to supply fuel to the spray holes when the needle valve is opened. In the past the small diameter end of the valve seat was established by the dimensions of the sack region and was such that metal grinding could be used to finish such valve seats.

Anticipated emission regulations require reduction of such emissions by requiring that sacks of fuel injector nozzles be reconfigured to a V-shape to have a reduced fuel containing space in the nozzle when the valve needle closes while retaining a valve seat configured as a frustrum of a cone. Such reconfigured sack regions result in a significant reduction in the small end diameter of the valve seat. Consequently, the small end diameter of a conical grinding wheel used to grind the seat also is reduced in diameter significantly. As a result, the surface speed of the abrasive grains in the small end diameter of the conical grinding wheel is too low for efficient grinding.

SUMMARY OF THE INVENTION

The subject invention provides an improved method and apparatus for precision finishing the interior of a fuel injector nozzle body; the apparatus including a combined operation of bore grinding and non-contact metal machining of the valve seat in the same machine so as to obtain concentricity between the bore and seat. In particular the apparatus includes an indexable rotary table carrying a plurality of work holders each carrying a fuel injector nozzle body. The machine further includes a plurality of cross and longitudinal slide mounted finishing tools including at least a guide bore grinder spindle and an EDM seat machining station. The indexable work heads are precisely aligned with the spindle so that a cylindrical grinding wheel will grind the valve guide bore surface. Thereafter the workhead with the ground bore is precisely positioned by the same index system to precisely EDM finish the valve seat. The EDM electrode is insertable into the formed nozzle interior and valve seat which are concentric to the valve guide bore to cooperate with a later assembled needle valve to produce a reduced volume "sackless" fuel space between the valve seat and spray holes to control fuel dribble therefrom when the valve is closed.

The method of the present invention includes indexing a fuel injector nozzle body blank with a center cut bore and pre-formed valve seat with a V-shaped surface in the shape of a frustrum of a cone on a single machine platform to maintain precise axial alignment with a first bore grinding station and with a second non-contact machining station that forms the V-shaped surface by non-contact machining to define a minimal nozzle fuel volume to reduce fuel dribble.

PRIOR ART STATEMENT

Machining methods of U.S. Pat. Nos. 2,377,159 and 3,783,225 disclose use of cone-shaped electrodes to remove material from a workpiece to form a shaped hole in the workpiece. There is no suggestion of apparatus or methods including combined grinding and non-contact machining to form a sackless fuel injector nozzle body with a precision formed valve seat.

U.S. Pat. Nos. 3,072,777 and 3,614,371 disclose apparatus for moving a non-contact machining electrode transversely of a workpiece to form an opening therein. The apparatus does not include means for concurrently grinding and non-contact machining a pair of workpieces by the apparatus and method of the present invention.

BRIEF DESCRIPTION OF THE INVENTION

Other advantages of the present invention will be readily appreciated as the same becomes better understood by reference to the following detailed description when considered in connection with the accompanying drawings, wherein:

FIG. 3 is a cross-sectional view of a fuel injector nozzle body blank to be finished by the present invention;

FIG. 4 is an enlarged fragmentary side view of a typical electrode used with the present invention;

FIG. 5 is a cross-sectional view of a fuel injector nozzle body finished by the present invention;

FIG. 6 is a side view of a punch used on the blank of FIG. 3 in preparation for the operation of the present invention;

FIG. 7 is an enlarged fragmentary cross-sectional view of the blank of FIG. 3 after being pre-formed by the punch of FIG. 6; and FIGS. 8 through 8C are diagrammatic views of the operating positions of the apparatus of FIG. 1.

DESCRIPTION OF PREFERRED EMBODIMENT

Figure 1:
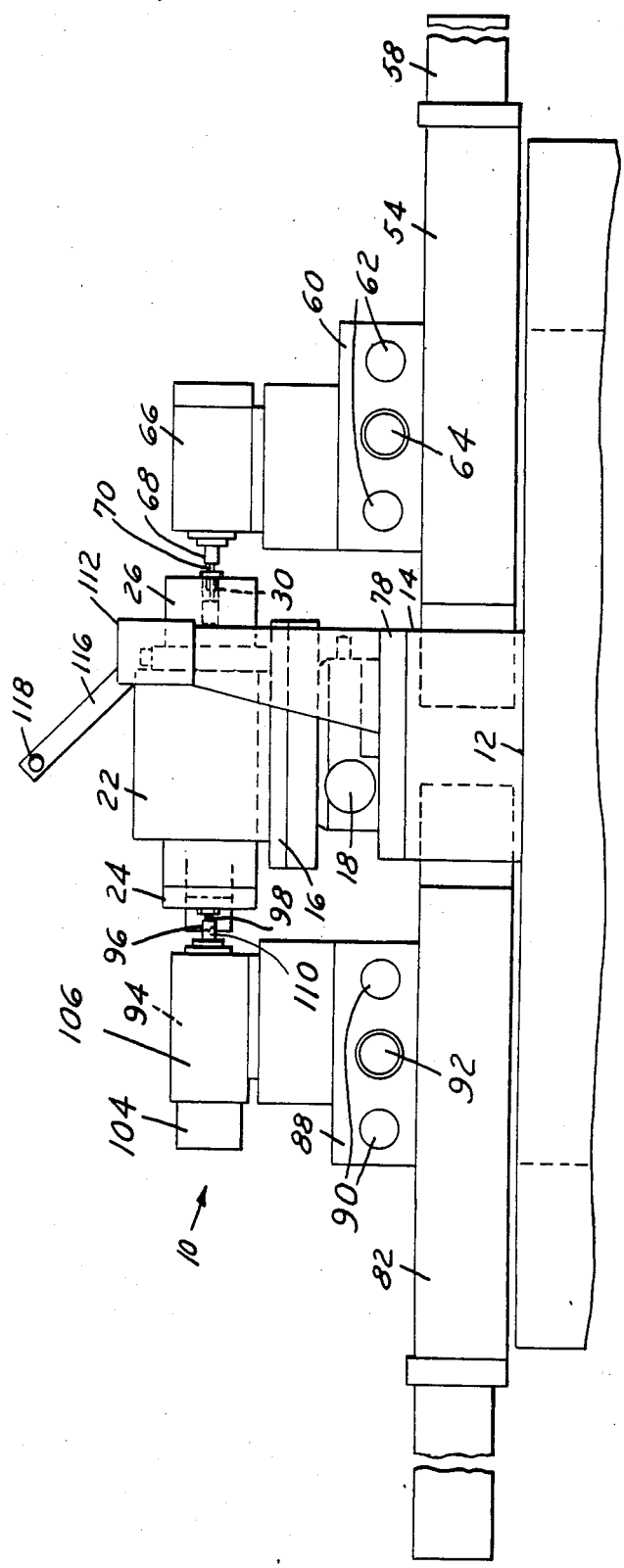
FIG. 1 is a side elevational view of apparatus for practicing grinding and electrical discharge machining the nozzle body of a fuel injector in accordance with the present invention.
Figure 2:
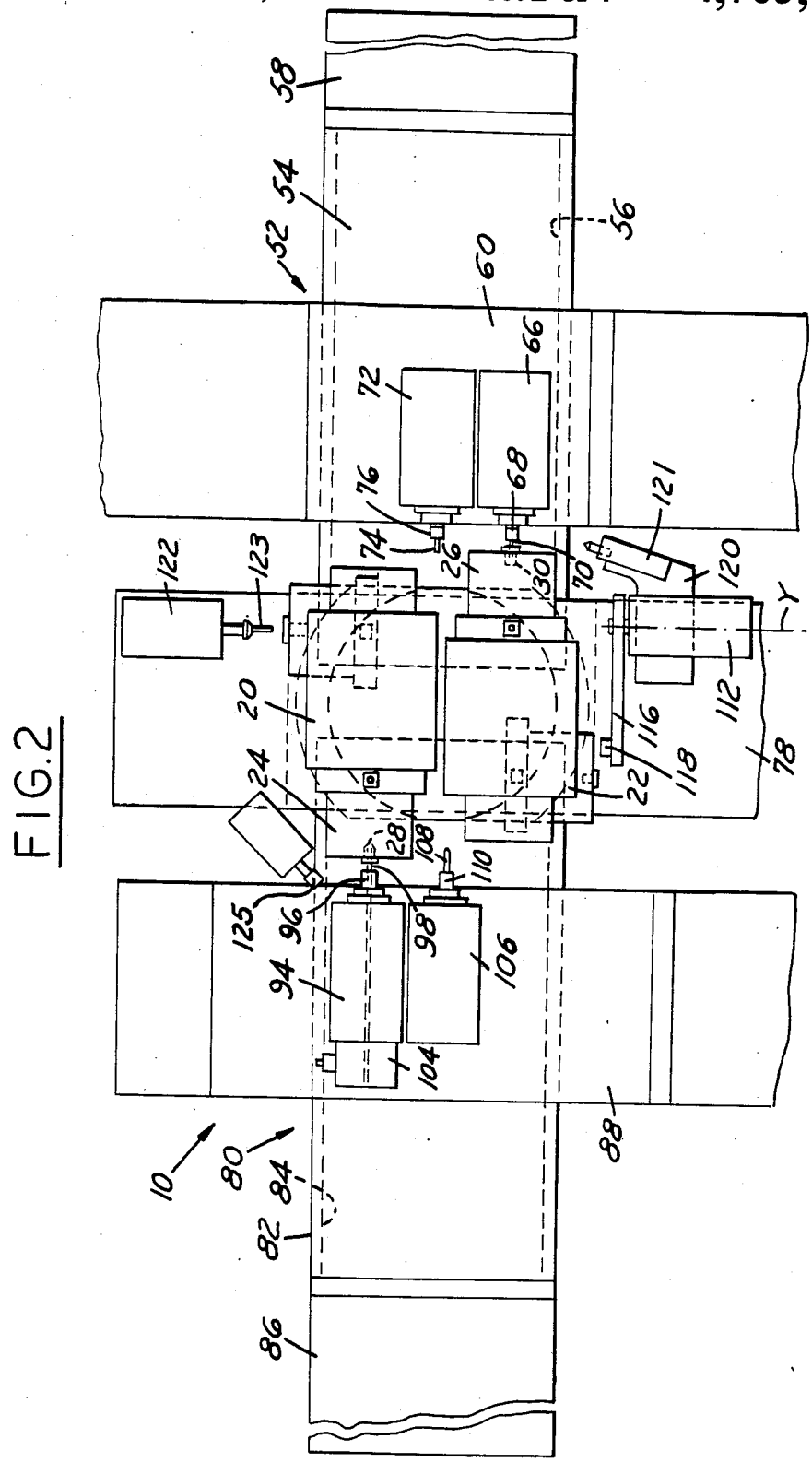
FIG. 2 is a top plan view of the apparatus of FIG. 1.

As illustrated in FIGS. 1 and 2, combination grinding and EDM apparatus 10 includes a machine base 12 having a bridge 14 that rotatably supports an indexable turret 16. The turret 16 is commercially available and may include a rotary drive system including a ball screw actuator driven by a D.C. servo-controlled motor 18 that can be precisely controlled by a servo power system including position resolvers of the type more particularly discussed in U.S. Pat. No. 4,419,612, issued Dec. 6, 1983 with a common assignee.

As shown in FIG. 2, the turret 16 carries two work holders 20 and 22, each having an end fixture 24 and 26, respectively, with recessed bores 28 and 30, respectively, for receiving a nozzle body blank 32 of the type shown in FIG. 3.

Each blank 32 more particularly includes a housing 34 with a pre-formed bore 36 extending from the face 38 of a locating flange 40 to a blind hole formed by a cone-shaped interior nozzle surface 42 with an end surface 44. The surfaces 42 and 44 define a punch engaging surface which is cold-formed and non-contact machined to define a sackless spray tip, as will be explained. The bore 36 includes a needle valve guide surface 48 and a transition section 50 which communicates with fuel supply passages 52 in the nozzle body.

The apparatus further includes a compound slide unit 52 with a Z-axis slide 54 supported for reciprocation in a slide way 56 by a ball screw actuator including a servo-controlled D.C. motor drive 58 and control system. The slide unit 52 also has an X-axis slide 60 supported for reciprocation in a slide way 62 mounted on the Z-axis slide 54. The drive for the X-axis slide 60 is a ball screw actuator including a servo-controlled D.C. motor drive 64. The servo-controlled motors and ball screw actuators are of the type set forth in the above referenced U.S. Pat. No. 4,419,612, or its equivalent. The slide 60 carries a high speed bore grinding spindle 66 having motor means that drives a rotatable head 68 on which is located a cylindrical grinding wheel 70 that has abrasive particles on its outer periphery that finish the valve guide bore 36. A guide bore lap spindle 72 is carried on the X-axis slide 60 and has a cylindrical lap 74 extending from a guide member 76, with its axis parallel to the axis of the cylindrical grinding wheel 70.

A fixed worktable 78 on the bridge 14 extends parallel to the X-axis slide 60 and to a second compound slide unit 80 on the opposite side of the bridge 14 from the compound slide unit 52. The compound slide unit 80 includes a Z-axis slide 82 driven in a slide way 84 by suitable drive means 86, such as the previously described servo-controlled D.C. motor driven ball screw apparatus. An X-axis slide 88 of the unit 80 is supported for reciprocation in a slide way 90 mounted on the Z-axis slide unit 82, and driven by suitable drive means 92.

An electrical discharge machining (EDM) apparatus 94 is carried by the X-axis slide 88. The apparatus 94 includes a chuck 96 for feeding an electrode 98 (FIG. 4) into the valve guide bore 36 along the ground bore axis. The electrode 98 has a V-shaped conical surface 100 with a tip 102.

As illustrated in FIG. 1, the electrical discharge machining apparatus 94 includes a suitable housing having a dielectric storage tank (not shown) therein into which dielectric fluid from the spark gap may be drained. The turret 16 is positioned on the base bridge 14 to locate a workpiece, such as the fuel injector nozzle body blank 32 in which a nozzle interior volume is to be non-contact machined. Electrode feed structure, represented at 104, is secured to and insulated from the slide 88. The electrode feed structure 104 is controlled by a trigger circuit and control circuit which may be included in a control box (not shown) which further includes suitable controls for the slide and indexing table drives to produce the machine positions to be described.

The dielectric storage tank and associated dielectric fluid supply and return structure form no part of the present invention and will not therefore be considered in detail herein. It is only necessary that apparatus be provided to supply a dielectric fluid between the electrode 98 in the electrode feed structure and the workpiece 32 when positioned by the indexable turret 16.

A valve seat lap spindle 106 is carried on the X-axis slide 88 and has a frusto-conical lap 108 extending from a guide member 110, with its longtidunal axis parallel to the working axes of all previously described metal finishing tools.

A loader 112 (FIG. 2) is supported on the worktable 78. It includes a swing arm 116 having a suitable socket 118 to receive a blank 32 in a pre-load position in which the work holders 20 and 22 will clear the loader 112 as the turret 16 is rotatably indexed to its various machine operating positions. The loader 112 is driven by suitable drive means (not shown) on the axis Y (FIG. 1), following the indexing of the turret, to load a blank 32 in either work holder bore 28 or 30.

A dresser assembly 120 (FIG. 2) is fixedly secured to the worktable 78 and includes a single-point dresser tool 121 for dressing the grinding wheel 70. A dresser assembly 125 serves to dress the electrode surface 100 (FIG. 4). Suitable other dressers (not shown) may be fixedly secured to the worktable 78 to respectively dress the laps 74 and 108. A valve seat gage apparatus 122 is mounted on the work table 78, including a movable probe 123 to indicate the final valve seat geometry at the 90° index point prior to the bore grinding and lapping station.

As indicated previously, the pre-formed blank 32 is first shaped to produce a reduced fuel sack region in the fuel injector spray tip. This is accomplished by a punch 124 (FIG. 6) which is positioned in axial alignment with the open end of the bore 36 of the fixtured blank 32. The punch 124 includes a shank 128 and a cylindrical extension 130. The cone-shaped tip 126 is formed on the end of the extension 130, and includes a truncated cone surface 132 with a cone extension 133. Suitable slide structure (not shown) moves the punch 124 into the bore 36 to cause the tip 126 of the punch to cold form the surfaces 42 and 44 to produce a conical- shaped interior rough surface 134 with a relief space 136 (FIG. 7).

Following the cold forming of surfaces 42 and 44 into the surfaces 134 and 136, the slide structure retracts the punch 124 from the blank 32, and suitable spray holes 138 (FIG. 5) are later formed to intersect the relief space 136.

Thereafter, the machine operations to finish the fuel injector nozzle body blanks 32 to include frustrum-of-a-cone-shaped valve seats 140 (FIG. 5) include positioning the machine components as shown in FIGS. 8 through 8C. The apparatus 94 has suitable electrolyte supply and return means to remove metal eroded from the cone-shaped rough surface 134 to form the valve seat 140 (FIG. 5) during the non-contact machining of the valve seat. The cone-shaped interior surface 134 is configured to provide a gap between the surface 100 and its tip 102 and the nozzle body interior 134 to prevent excessive electrode wear. In the position shown in FIG. 8, the indexable turret 16 positions the work holders 20 and 22 in a part load position and a part gage position. In the FIG. 8 position the machine is controlled to cause the compound slides 52 and 80 to move the finishing tools to the fixed location of their respective dressers for truing the shape of the grinding wheel, laps, and electrode in preparation for metal finishing steps. The loader 112 places a blank 32 into the end fixture 24 of the work holder 20, and the probe 123 of the valve seat gage 122 inspects a previously machined and lapped blank to determine if further bore grinding and non-contact machining is required to meet predetermined finished part specifications and dimensional tolerances. The machine control is then pre-set to carry out the necessary machining operations.

The machining sequence is initiated by indexing the turret 16 to the FIG. 8A position. The locating axes $X_1$ and $X_2$ of the work holders 20 and 22 are always parallel to one another, and the compound slides 52 and 80 are moved to align the cylindrical grinding wheel 70 of the high speed bore grinding spindle 66 with a blank 32 in the holder 22 and the EDM apparatus 94 with a blank 32 in the holder 20. The respective blanks 32 are simultaneously machined by controlling the compound slides 52 and 80 for X-Z axis movement of the working grinding wheel 70 and the EDM electrode 98. Following the machining cycle the working tools are retracted from the blanks 32, and the compound slides 52 and 80 are advanced to the FIG. 8B position.

In the FIG. 8B position, the laps 108 and 74 work on oppositely disposed blanks 32 to respectively lap the valve seat previously EDM machined by the apparatus 94 at the FIG. 8A position and the valve guide bore previously machined by the cylindrical grinding wheel 70, also at the FIG. 8A position. Following lapping, the compound slides 52 and 80 retract the lap tools from the blanks, and the indexable turret is rotated ninety degrees to the FIG. 8C position.

In the FIG. 8C position, the completely finished blank 32 is unloaded from the work holder 22 and a new blank loaded thereon, while the blank 32 still held in the work holder 20 either has its valve seat gaged or pressure tested for valve seat leakage, prior to being indexed ninety degrees to have the bore ground and then lapped, as shown in FIGS. 8A and 8B for the work holder 22. Thereafter, of course, the finished blank 32 is unloaded from the work holder 20, as shown in FIG. 8C for the work holder 22.

The method of the present invention includes finishing a fuel injector nozzle body interior by simultaneously locating two or more nozzle body blanks on a single indexable platform which positions the longitudinal axes of the blanks in spaced parallelism, with each blank having its bore opening facing in an opposite direction; and thereafter simultaneously grinding a valve bore guide surface on one of the blanks and non-contact machining the valve seat of another blank and wherein the single indexable platform is advanced so the previously EDM finished blank will be indexably positioned on a grinding axis so that a grinding wheel may grind the valve bore guide to be concentric to the EDM formed valve seat.

The concentricity of the valve guide bore and the valve seat is obtained because of the fact that the fuel injector nozzle body continues to be held in the same chuck and rotated on the same workhead bearings during all bore and seat metal removal operations.

The differences between the grinding and EDM apparatus embodiments for finishing fuel injector nozzle bodies and the operations at the various work stations are dependent upon particular fuel injector nozzle body dimensional and performance requirements. Certain machines may omit seat gaging and/or bore lapping. Which ones of given operations are performed simultaneously on one or more pairs of work heads will result in machining cycles which may be shorter or longer depending upon the number of finishing operations that are required for a given valve design and/or the number of simultaneous operations that can be performed in each of a plurality of indexed positions of the turret 16.

The resultant fuel injector nozzle body (FIG. 5) is thereby configured to have an interior end surface and valve seat 140 as a frustrum of a cone with a small end diameter to large end diameter ratio on the order of 1-50 that will position a needle valve 142 to be closely spaced with the nozzle interior surface to define a reduced volume space with a limited fuel capacity following valve closure. Accordingly, the nozzle body in an assembled fuel injector assembly will reduce heretofore fuel dribble problems produced in nozzles with hemispherically configured fuel sacks.

This invention has been described in an illustrative manner, and it is to be understood that the terminology which has been used is intended to be in the nature of words of description rather than of limitation.

Many modifications and variations of the present invention are possible in light of the above teachings. It is therefore to be understood that other embodiments of apparatus and method may be practiced otherwise than as specifically described herein and yet remain within the scope of the appended claims.

The embodiments of the invention in which an exclusive property or privilege is claimed are defined as follows:

1. A method for concentrically forming a valve guide bore and a valve seat in respective fuel injector nozzle body blanks having a center-cut bore terminating in a blind hole defined in part by a pre-formed cone shaped surface to locate a needle valve component therein so as to reduce the fuel dribble capacity of the nozzle body, said method comprising the following steps:
   a. loading a first blank at one station on one of two work head means on an indexable turret;
   b. indexing the turret 90 degrees;
   c. non-contact machining a valve seat surface on the pre-formed cone shaped surface of the first blank to be concentric with the longitudinal axis of the nozzle body;
   d. moving a first cross slide bearing the non-contact machining means to align seat lapping means with the valve seal surface;
   e. lapping the valve seat surface;
   f. returning the cross slide to its preceding position;
   g. indexing the turret another 90 degrees;
   h. loading a second blank on the second work head means;
   i. indexing the turret a further 90 degrees;
   j. grinding the bore of the first blank to be concentric with the longitudinal axis of the nozzle body while concurrently and concentrically non-contact machining the valve seat surface of the second blank;
   k. concurrently moving said first cross slide and a second cross slide bearing the bore grinding means to align respective seat lapping and bore lapping means with said first and second blanks;
   l. lapping the respective value seat and bore so as to be concentric with one another;
   m. returning the first and second cross slides to their respective preceding positions; and
   n. unloading the first blank as a finished fuel injection nozzle body.

2. The method described in claim 1, and the further step of gaging the lapped valve seat surface of the first blank while the second blank is being loaded.

3. A method for concentrically forming a valve guide bore and a valve seat in respective fuel injector nozzle body blanks having a center cut bore terminating in a blind hole defined in part by a performed cone shaped surface to locate a needle valve component therein so as to reduce the fuel dribble capacity of the nozzle body, said method comprising the steps of:

(a) performing the valve seat as a frustrum of a cone to have a small end diameter to large end diameter ratio on the order of 1-50;

(b) grinding the center cut bore surfaces to the blind hole of one blank and concurrently non-contact machining a valve seat surface of a second blank by use of a consumable spark gap electrode including a conical surface closely spaced from the pre-formed valve seat and concentrically of the valve guide bore; and (c) rotating said ground and non-contact machined nozzle body blanks into alignment with respective bore and valve seat lapping means, and concurrently and concentrically lapping said ground bore and machined valve surfaces.

4. The method described in claim 3, and rotating said lapped bore and valve seat blanks into alignment with respective unloading/loading and seat gaging means, and concurrently unloading and gaging said respective blanks and loading a new blank in place of the unloaded lapped bore blank.

5. The method described in claim 3, and rotating said lapped bore and valve seat blanks into alignment with respective unloading/loading and pressure testing means, and concurrently unloading and pressure testing said respective blanks and loading a new blank in place of the unloaded lapped bore blank.

* * * * *